United States Patent
Ruediger et al.

(10) Patent No.: US 8,044,122 B2
(45) Date of Patent: Oct. 25, 2011

(54) POLYCARBONATE COMPOSITION CONTAINING UV ABSORBER

(75) Inventors: Claus Ruediger, Krefeld (DE); Michael Wagner, Moers (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/428,166

(22) Filed: Apr. 22, 2009

(65) Prior Publication Data

US 2009/0258978 A1    Oct. 15, 2009

Related U.S. Application Data

(63) Continuation-in-part of application No. PCT/EP2008/001502, filed on Feb. 26, 2008.

(30) Foreign Application Priority Data

Mar. 7, 2007    (DE) .................. 10 2007 011 069

(51) Int. Cl.
*C08K 5/3472*    (2006.01)
*C08K 5/3492*    (2006.01)
*C08K 5/315*    (2006.01)

(52) U.S. Cl. ...................... 524/100; 524/91; 524/208

(58) Field of Classification Search ................ 524/91, 524/100, 208
See application file for complete search history.

(56) References Cited

U.S. PATENT DOCUMENTS

| | | |
|---|---|---|
| 5,340,905 A | 8/1994 | Kuehling et al. |
| 5,672,645 A | 9/1997 | Eckel et al. |
| 6,060,543 A | 5/2000 | Bolle et al. |
| RE36,902 E | 10/2000 | Eckel et al. |
| 6,218,450 B1 | 4/2001 | Fagerburg |
| 6,352,783 B1 | 3/2002 | Fagerburg |
| 6,632,864 B2 | 10/2003 | Gorny et al. |
| 2002/0083641 A1 | 7/2002 | Leppard et al. |
| 2002/0151623 A1 | 10/2002 | Gorny et al. |

FOREIGN PATENT DOCUMENTS

| | | |
|---|---|---|
| DE | 1031512 | 6/1958 |
| DE | 4238123 A1 | 5/1994 |
| DE | 19739797 A1 | 3/1998 |
| EP | 0640655 A2 | 3/1995 |
| EP | 1308084 A1 | 5/2003 |
| WO | WO-99/55772 A1 | 10/1999 |
| WO | WO-02/34826 A1 | 5/2002 |
| WO | WO-2005/030856 A1 | 4/2005 |

*Primary Examiner* — Kriellion Sanders
(74) *Attorney, Agent, or Firm* — Connolly Bove Lodge & Hutz LLP

(57) ABSTRACT

The present invention relates to a composition containing polycarbonate and from 0.05 wt. % to 0.5 wt. % of a UV absorber and from 0.0001 wt. % to 0.03 wt. % 2-[2-hydroxy-4-(2-ethylhexyl)oxy]phenyl-4,6-di(4-phenyl)phenyl-1,3,5-triazine.

18 Claims, No Drawings

US 8,044,122 B2

POLYCARBONATE COMPOSITION CONTAINING UV ABSORBER

CROSS-REFERENCE TO RELATED APPLICATION

This application claims priority under 35 U.S.C. §119 (a-d) to German application DE 10 2007 011 069.5, filed Mar. 7, 2007, and claims priority under 35 U.S.C. §§120 and 365(c) to International Application No. PCT/EP2008/001502, filed Feb. 28, 2008.

FIELD OF THE INVENTION

The present invention relates to a composition containing polycarbonate and from 0.05 wt. % to 0.5 wt. % of a UV absorber and from 0.0001 wt. % to 0.03 wt. % 2-[2-hydroxy-4-(2-ethylhexyl)oxy]phenyl-4,6-di(4-phenyl)phenyl-1,3,5-triazine (CAS No. 204583-39-1).

BACKGROUND OF THE INVENTION

A variety of stabilisers for polymeric moulding compositions and moulding compositions provided therewith have been described in the literature. The stabilisers are intended to maintain the inherent positive properties of the polymeric moulding compositions at a continued high level even under external influences that may adversely affect the property profile of the polymers. Especially when polymers are used in the exterior sector, stabilisation against damage by light is an important aspect for long-term usability of the corresponding moulded bodies. Such moulded bodies can be, for example, sheets of thermoplastic plastics, such as, for example, polycarbonates, which are used inter alia in the form of solid sheets, multi-wall sheets, twin-wall sheets, corrugated sheets, profiles, corresponding multi-layer systems or further forms. However, not only is it important that the moulded bodies should continue to exhibit attractive optical properties even after weathering, the mechanical properties of the moulded bodies must at the same time be maintained at a high level in order that their structural integrity or stability can be ensured in the long term even in the case of adverse environmental conditions.

U.S. Pat. No. 6,218,450 and U.S. Pat. No. 6,352,783 describe in this connection specific copolyester blends with UV absorbers, which are used inter alia in the production of protective layers for thermoformed articles having good surface properties as well as good physical properties.

US 2002/0083641 discloses the stabilisation of thin polyolefin, polyester or polyamide layers against damage by light, oxygen, heat and aggressive chemicals using hydroxyphenyltriazines.

U.S. Pat. No. 6,632,864 describes thermoplastic polymers provided with UV absorbers of the benzotriazole type. The use of such polymers for the extrusion of sheets having good surface quality and good UV protection is additionally disclosed.

WO 02/34826 discloses thermoplastic plastics provided with UV absorbers of the benzotriazole and triazine type, as well as products made therefrom. When extruded, in particular in the case of prolonged continuous processing, the plastics exhibit a good surface quality and constant protection against UV radiation.

DE 19739797 describes mixtures of different triazine compounds for use as stabilisers for organic materials, in particular surface coatings, against damage by light, heat and oxygen.

EP-A-1 308 084 discloses mixtures of compounds of the 2,4-bis-(4-phenylphenyl)-6-(2-hydroxyphenyl)-1,3,5-triazine class with further selected UV absorbers for stabilising organic materials against damage by light, heat and oxygen.

It is also known to use 2-[2-hydroxy-4-(2-ethylhexyl)oxy]phenyl-4,6-di(4-phenyl)phenyl-1,3,5-triazine (CAS No. 204583-39-1) as a UV absorber, as is described in EP 1308084.

SUMMARY OF THE INVENTION

The object of the present invention is to provide UV-stabilised polycarbonate compositions which, as well has having good optical properties, exhibit improved impact strength as compared with the prior art—in particular at low temperatures.

The present invention accordingly relates to a composition containing polycarbonate and from 0.05 wt. % to 0.5 wt. % of a UV absorber and from 0.0001 wt. % to 0.03 wt. % 2-[2-hydroxy-4-(2-ethylhexyl)oxy]phenyl-4,6-di(4-phenyl)phenyl-1,3,5-triazine (CAS No. 204583-39-1).

Such a composition exhibits unexpectedly good physical and mechanical properties. In particular, such polycarbonate compositions exhibit improved notched impact strength after irradiation with UV light at low temperatures of −20° C. Such polycarbonate compositions are especially suitable for use in solid sheets or multi-wall sheets. They can also be used as the basis of multi-layer systems. The present invention therefore relates inter alia also to a multi-layer sheet which has a base layer, the base layer containing the composition.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

Within the scope of the present invention, the composition comprises substances, materials and/or mixtures thereof. The composition is composed at least of three starting materials, namely at least of a polycarbonate in combination with 2-[2-hydroxy-4-(2-ethylhexyl)oxy]phenyl-4,6-di(4-phenyl)phenyl-1,3,5-triazine (CAS No. 204583-39-1) and a LV absorber as the third starting material.

Polycarbonates for the compositions according to the invention are homopolycarbonates, copolycarbonates and thermoplastic polyester carbonates.

The polycarbonates and copolycarbonates according to the invention generally have mean molecular weights (weight average) of from 2000 to 200,000, preferably from 3000 to 150,000, in particular from 5000 to 100,000, most particularly preferably from 8000 to 80,000, especially from 12,000 to 70,000 (determined by GPC with polycarbonate calibration).

In this context they preferably further have mean molecular weights $M_r$ of from 18,000 to 40,000 g/mol, particularly preferably from 26,000 to 36,000 g/mol and particularly preferably from 28,000 to 35,000 g/mol, determined by measuring the relative solution viscosity in dichloromethane at 25° C. or in mixtures of equal amounts by weight of phenol/o-dichlorobenzene calibrated by light scattering, or by means of gel permeation chromatography (GPC) with polycarbonate calibration.

For the preparation of polycarbonates for the compositions according to the invention, reference may be made, for example, to "Schnell", Chemistry and Physics of Polycarbonates, Polymer Reviews, Vol. 9, Interscience Publishers, New York, London, Sydney 1964, to D. C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75-90 (1980), to D. Freitag, U. Grigo, P. R. Müller, N. Nouvertne, BAYER AG, "Polycarbonates" in Encyclopedia of Polymer Science and Engineering, Vol. 11, Second Edition, 1988, pages 648-718, and finally to Dres. U. Grigo, K. Kircher and P. R. Müller, "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299. The preparation is preferably carried out by the interfacial process or the melt transesterification process and is first described using the example of the interfacial process.

Compounds that are preferably to be used as starting compounds are bisphenols of the general formula HO—Z—OH, wherein Z is a divalent organic radical having from 6 to 30 carbon atoms, which contains one or more aromatic groups. Examples of such compounds are bisphenolk belonging to the group of the dihydroxydiphenyls, bis(hydroxyphenyl)alkanes, indane bisphenols, bishydroxyphenyl)ethers, bis(hydroxyphenyl)sulfones, bis(hydroxyphenyl)ketones and $\alpha,\alpha'$-bis(hydroxyphenyl)-diisopropylbenzenes.

Particularly preferred bisphenols belonging to the above-mentioned compound groups are bisphenol A, tetraalkyl bisphenol A, 4,4-(meta-phenylenediisopropyl)diphenol (bisphenol M), 4,4-(para-phenylenediisopropyl)-diphenol, N-phenyl-isatinbisphenol, 1,1-bis-(4-hydroxyphenyl)-3,3,5-trimethyl-cyclohexane (BP-TMC), bisphenols of the 2-hydrocarbyl-3,3-bis(4-hydroxyaryl)-phthalimidine type, especially 2-phenyl-3,3-bis(4-hydroxyphenyl)phthalimidine, and optionally mixtures thereof. Particular preference is given to homopolycarbonates based on bisphenol A and to copolycarbonates based on the monomers bisphenol A and 1,1-bis-(4-hydroxyphenyl)-3,3,5-trimethyl-cyclohexane. The bisphenol compounds to be used according to the invention are reacted with carbonic acid compounds, especially phosgene, or, in the case of the melt transesterification process, with diphenyl carbonate or dimethyl carbonate.

Polyester carbonates are obtained by reaction of the bisphenols already mentioned, at least one aromatic dicarboxylic acid and optionally carbonic acid equivalents. Examples of suitable aromatic dicarboxylic acids include phthalic acid, terephthalic acid, isophthalic acid, 3,3'- or 4,4'-diphenyldicarboxylic acid and benzophenonedicarboxylic acids. Some, up to 80 mol %, preferably from 20 to 50 mol %, of the carbonate groups in the polycarbonates can be replaced by aromatic dicarboxylic acid ester groups.

Examples of inert organic solvents used in the interfacial process include dichloromethane, the various dichloroethanes and chloropropane compounds, tetrachloromethane, trichloromethane, chlorobenzene and chlorotoluene. Preference is given to the use of chlorobenzene or dichloromethane or mixtures of dichloromethane and chlorobenzene.

The interfacial reaction can be accelerated by catalysts such as tertiary amines, especially N-alkylpiperidines or onium salts. Preference is given to the use of tributylamine, triethylamine and N-ethylpiperidine. In the case of the melt transesterification process, the catalysts mentioned in DE-A 42 38 123 are used.

The polycarbonates can be branched in a deliberate and controlled manner by the use of small amounts of branching agents. Some suitable branching agents are: isatinbiscresol, phloroglucinol, 4,6-dimethyl-2,4,6-tri-(4-hydroxyphenyl)-heptene-2; 4,6-dimethyl-2,4,6-tri-(4-hydroxphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]-propane; 2,4-bis-(4-hydroxyphenyl-isopropyl)-phenol; 2,6-bis-(2-hydroxy-5'-methylbenzyl)-4-methylphenol; 2-(4-hydroxyphenyl)-2-(2,4-dihydroxyphenyl)-propane; hexa-(4-(4-hydroxyphenyl-isopropyl)-phenyl)-orthoterephthalic acid ester; tetra-(4-hydroxyphenyl)-methane; tetra-(4-(4-hydroxyphenyl-isopropyl)-phenoxy)-methane; $\alpha,\alpha',\alpha''$-tris-(4-hydroxyphenyl)-1,3,5-triisopropylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4,4"-dihydroxytriphenyl)-methyl)-benzene and especially: 1,1,1-tri-(4-hydroxyphenyl)-ethane and bis-(3-methyl-4-hydroxyphenyl)-2-oxo-2,3-dihydroindole.

The from 0.05 to 2 mol %, based on diphenols used, of branching agents or mixtures of branching agents that are optionally to be employed concomitantly can be used together with the diphenols or alternatively can be added at a later stage of the synthesis.

Chain terminators can be used. There are preferably used as chain terminators phenols such as phenol, alkylphenols such as cresol and 4-tert.-butylphenol, chlorophenol, bromophenol, cumylphenol or mixtures thereof, in amounts of from 1 to 20 mol %, preferably from 2 to 10 mol %, per mole of bisphenol. Preference is given to phenol, 4-tert.-butylphenol and cumylphenol.

Chain terminators and branching agents can be added to the syntheses separately or alternatively together with the bisphenol.

The preferred polycarbonate according to the invention is the homopolycarbonate of bisphenol A.

Alternatively, the polycarbonates according to the invention can also be prepared by the melt transesterification process. The melt transesterification process is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964) and also in DE-C 10 31 512.

In the melt transesterification process, the aromatic dihydroxy compounds already described in connection with the interfacial process are transesterified in the melt with carbonic acid diesters, with the aid of suitable catalysts and, optionally, further additives.

Carbonic acid diesters within the scope of the invention are those of formulae (1) and (2)

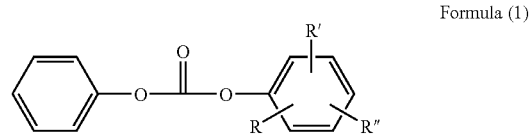

Formula (1)

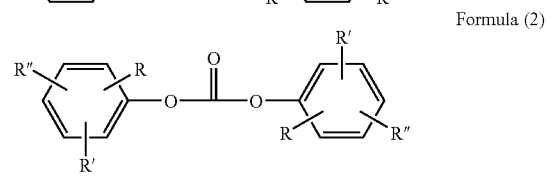

Formula (2)

wherein

R, R' and R'', independently of one another, can represent H, optionally branched $C_1$-$C_{34}$-alkyl/cycloalkyl, $C_7$-$C_{34}$-alkaryl or $C_6$-$C_{34}$-aryl, for example diphenyl carbonate, butylphenyl-phenyl carbonate, di-butylphenyl carbonate, isobutylphenyl-phenyl carbonate, di-isobutylphenyl carbonate, tert.-butylphenyl-phenyl carbonate, di-tert.-butylphenyl carbonate, n-pentylphenyl-phenyl carbonate, di-(n-pentylphenyl)carbonate, n-hexylphenyl-phenyl carbonate, di-(n-hexylphenyl)carbonate, cyclohexylphenyl-phenyl carbonate, di-cyclohexylphenyl carbonate, phenylphenol-phenyl carbonate, di-phenylphenol carbonate, isooctylphenyl-phenyl carbonate, di-isooctylphenyl carbonate, n-nonylphenyl-phenyl carbonate, di-(n-nonylphenyl)carbonate, cumylphenyl-phenyl carbonate, di-cumylphenyl carbonate, naphthylphenyl-phenyl carbonate, di-naphthylphenyl carbonate, di-tert.-butylphenyl-phenyl carbonate, di-(di-tert.-butylphenyl)carbonate, dicumylphenyl-phenyl carbonate, di-(dicumylphenyl)carbonate, 4-phenoxyphenyl-phenyl carbonate, di-(4-phenoxyphenyl)carbonate, 3-penta-decylphenyl-phenyl carbonate, di-(3-pentadecylphenyl)carbonate, tritylphenyl-phenyl carbonate, di-tritylphenyl carbonate, preferably diphenyl carbonate, tert.-butylphenyl-phenyl carbonate, di-tert.-butylphenyl carbonate, phenylphenol-phenyl carbonate, di-phenylphenol carbonate, cumylphenyl-phenol carbonate, di-cumylphenyl carbonate, particularly preferably diphenyl carbonate.

It is also possible to use mixtures of the mentioned carbonic acid diesters.

The amount of carbonic acid esters is from 100 to 130 mol %, preferably from 103 to 120 mol %, particularly preferably from 103 to 109 mol %, based on the dihydroxy compound.

As catalysts in the melt transesterification process within the scope of the invention there are used basic catalysts as described in the mentioned literature, such as, for example, alkali and alkaline earth hydroxides and oxides as well as ammonium or phosphonium salts, which are referred to hereinbelow as onium salts. Preference is given to the use of onium salts, particularly preferably phosphonium salts. Phosphonium salts within the scope of the invention are those of formula (3)

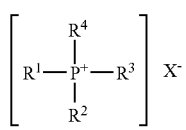

Formula (3)

wherein $R^{1-4}$ can be the same or different $C_1$-$C_{10}$-alkyls, $C_6$-$C_{10}$-aryls, $C_7$-$C_{10}$-aralkyls or $C_5$-$C_6$-cycloalkyls, preferably methyl or $C_6$-$C_{14}$-aryls, particularly preferably methyl or phenyl, and $X^-$ can be an anion, such as hydroxide, sulfate, hydrogen sulfate, hydrogen carbonate, carbonate, a halide, preferably chloride, or an alcoholate of the formula OR, wherein R can be $C_6$-$C_{14}$-aryl or $C_7$-$C_{12}$-aralkyl, preferably phenyl.

Preferred catalysts are tetraphenylphosphonium chloride,
tetraphenylphosphonium hydroxide,
tetraphenylphosphonium phenolate,
particularly preferably tetraphenylphosphonium phenolate.

The catalysts are preferably used in amounts of from $10^{-8}$ to $10^{-3}$ mol, based on one mole of bisphenol, particularly preferably in amounts of from $10^{-7}$ to $10^{-4}$ mol.

Further catalysts can be used on their own or optionally in addition to the onium salt in order to increase the rate of polymerisation. Such catalysts include salts of alkali metals and alkaline earth metals, such as hydroxides, alkoxides and aryloxides of lithium, sodium and potassium, preferably hydroxide, alkoxide or aryloxide salts of sodium. Sodium hydroxide and sodium phenolate are most preferred. The amounts of the co-catalyst can be in the range from 1 to 200 ppb, preferably from 5 to 150 ppb and most preferably from 10 to 125 ppb, in each case calculated as sodium.

The transesterification reaction of the aromatic dihydroxy compound and the carbonic acid diester in the melt is preferably carried out in two stages. In the first stage, melting of the aromatic dihydroxy compound and of the carbonic acid diester takes place in a period of from 0 to 5 hours, preferably from 0.25 to 3 hours, at temperatures of from 80 to 250° C., preferably from 100 to 230° C., particularly preferably from 120 to 190° C., under normal pressure. After addition of the catalyst, the oligocarbonate is prepared from the aromatic dihydroxy compound and the carbonic acid diester by removal of the monophenol by distillation by applying a vacuum (up to 2 mm Hg) and raising the temperature (to up to 260° C.). The principal amount of vapours from the process is thereby obtained. The oligocarbonate so prepared has a mean weight-average molar mass $M_w$ (determined by measuring the relative solution viscosity in dichloromethane or in mixtures of equal amounts by weight of phenol/o-dichlorobenzene calibrated by light scattering) in the range from 2000 g/mol to 18,000 g/mol, preferably from 4000 g/mol to 15,000 g/mol.

In the second stage, the polycarbonate is prepared in the polycondensation by further raising the temperature to from 250 to 320° C., preferably from 270 to 295° C., at a pressure of <2 mm Hg. The remaining vapours are thereby removed from the process.

It is also possible to use the catalysts in combination (two or more) with one another.

When alkali/alkaline earth metal catalysts are used, it can be advantageous to add the alkali/alkaline earth metal catalysts at a later time (e.g. after the oligocarbonate synthesis during the polycondensation in the second stage).

Within the scope of the process according to the invention, the reaction of the aromatic dihydroxy compound and of the carbonic acid diester to form the polycarbonate can be carried out discontinuously or, preferably, continuously, for example in stirrer vessels, thin-layer evaporators, falling film evaporators, stirrer vessel cascades, extruders, kneaders, simple plate reactors and high-viscosity plate reactors.

Analogously to the interfacial process, it is possible to prepare polycarbonates or copolycarbonates by the use of multifunctional compounds.

It is possible to add to the polycarbonates and copolycarbonates according to the invention, in a known manner, for example by compounding, other aromatic polycarbonates and/or other plastics, such as aromatic polyester carbonates, aromatic polyesters such as polybutylene terephthalate or polyethylene terephthalate, polyamides, polyimides, polyester amides, polyacrylates and polymethacrylates, such as, for example, polyalkyl(meth)acrylates and especially polymethyl methacrylate, polyacetals, polyurethanes, polyolefins, halogen-containing polymers, polysulfones, polyether sulfones, polyether ketones, polysiloxanes, polybenzimidazoles, urea-formaldehyde resins, melamine-formaldehyde resins, phenol-formaldehyde resins, alkyd resins, epoxy resins, polystyrenes, copolymers of styrene or of alpha-methylstyrene with dienes or acryl derivatives, graft polymers based on acrylonitrile/butadiene/styrene or graft copolymers based on acrylate rubber (see, for example, the graft polymers described in EP-A 640 655) or silicone rubbers.

It is possible to add to the polycarbonates according to the invention and to the further plastics that may be present therein additives conventional for such thermoplastics, such as fillers, further UV stabilisers, thermostabilisers, antistatics and pigments, in the conventional amounts; the mould release behaviour, the flow behaviour and/or the flame resistance can optionally also be improved by addition of external mould release agents, flow agents and/or flameproofing agents (e.g. alkyl and aryl phosphites, phosphates, phosphanes, low molecular weight carboxylic acid esters, halogen compounds, salts, chalk, quartz powder, glass fibres and carbon fibres, pigments and combinations thereof). Such compounds are described, for example, in WO 99/55772, p. 15-25, in EP 1 308 804 and in the appropriate chapters of the "Plastics Additives Handbook", ed. Hans Zweifel, 5th Edition 2000, Hanser Publishers, Munich.

Within the scope of the present invention, UV absorber means a compound that substantially absorbs UV rays.

The term "substantially" within the scope of the present invention means that the desired or required properties of a system are retained even in the case of a mathematically insignificant deviation. Preferably 80%, 90% or 95% of the target value under consideration is achieved.

Alkylaryl within the scope of the present invention means an alkyl radical carrying an aryl radical.

In a preferred embodiment, the UV absorber has the formula (4):

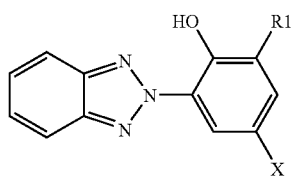

Formula (4)

wherein R1 and X are the same or different and can be H or alkyl or alkylaryl,
or the formula (5):

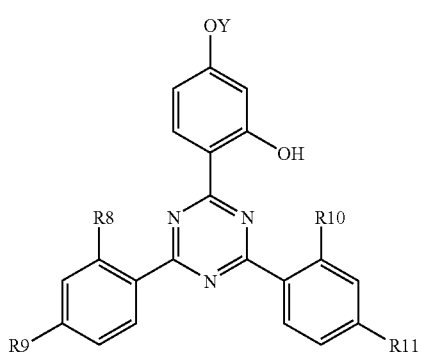

Formula (5)

wherein $R_8$, $R_9$, $R_{10}$, $R_{11}$ can be the same or different and represent H or aryl or alkyl or CN or halogen, and Y represents alkyl, or the formula (6):

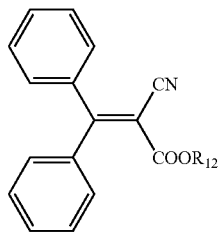

Formula (6)

wherein $R_{12}$ represents aryl or alkyl.

Particular preference is given to the following UV absorbers:

A. 2-(2H-benzotriazol-2-yl)-4-(1,1-dimethylethyl)-6-(1-methylpropyl)-phenol (CAS No. 36437-37-3), which is available commercially from Ciba Spezialitätenchemie under the name Tinuvin 350®, B. 2-(2H-benzotriazol-2-yl)-4-(1,1,3,3-tetramethylbutyl)-phenol (CAS No. 3147-75-9), which is available commercially from Ciba Spezialitätenchemie under the name Tinuvin® 329 or from BASF AG under the name Uvinul® 3029 or from Cytec Industries Inc. under the name Cyasorb® UV-5411, C. 2-(2H-benzotriazol-2-yl)-4,6-bis(1-methyl-1-phenylethyl)-phenol (CAS No. 70321-86-7), which is available commercially from Ciba Spezialitätenchemie under the name Tinuvin 234®, D. 2-(5-chloro-2H-benzotriazol-2-yl)-6-(1,1-dimethylethyl)-4-methyl)-phenol (CAS No. 3896-11-5), which is available commercially from Ciba Spezialitätenchemie under the name Tinuvin 326® or from BASF AG under the name Uvinul® 3026, E. 2,2'-methylenebis[6-(2H-benzotriazol-2-yl)-4-(1,1,3,3-tetramethylbutyl)-phenol (CAS No. 103597-45-1), which is available commercially from Ciba Spezialitätenchemie under the name Tinuvin 360® or from Adeka-Palmarole under the name ADK Stab LA31®.

F. 2-(4,6-diphenyl-1,3,5-triazin-2-yl)-5-(hexyloxy)-phenol (CAS No. 147315-50-2), which is available commercially from Ciba Spezialitätenchemie under the name Tinuvin 1577®, G. 2-[4,6-bis(2,4-dimethylphenyl)-1,3,5-triazin-2-yl]-5-(octyloxy)-phenol (CAS No. 2725-22-6), which is available commercially from Cytec Industries Inc. under the name Cyasorb® UV-1164, H. ethyl 2-cyano-3,3-diphenylacrylate (CAS No. 5232-99-5), which is available commercially from BASF AG under the name Uvinul® 3035, I. 2-ethylhexyl 2-cyano-3,3-diphenylacrylate (CAS No. 6197-30-4), which is available commercially from BASF AG under the name Uvinul® 3039, J. 1,3-bis-[(2'-cyano-3',3'-diphenylacryloyl)oxy]-2,2-bis-{[(2'-cyano-3',3'-diphenylacryloyl)oxy]methyl}-propane (CAS No. 178671-58-4), which is available commercially from BASF AG under the name Uvinul® 3030, K. tetra-ethyl-2,2'-(1,4-phenylene-dimethylidene)-bismalonate (CAS No. 6337-43-5), which is available commercially from Clariant GmbH under the name Hostavin® B-CAP™ XP3030.

In a further embodiment, the present invention relates to the composition according to the invention, characterised in that the UV absorber and 2-[2-hydroxy-4-(2-ethylhexyl)oxy]phenyl-4,6-di(4-phenyl)phenyl-1,3,5-triazine (CAS No.

204583-39-1) are present in a weight ratio of from 5000:1 to 30:1, preferably from 500:1 to 30:1, particularly preferably from 500:1 to 70:1.

In a further embodiment, the present invention relates to the composition according to the invention, characterised in that the composition substantially consists of polycarbonate and from 0.05 wt. % to 0.5 wt. % of a UV absorber and from 0.0001 wt. % to 0.03 wt. % 2-[2-hydroxy-4-(2-ethylhexyl)oxy]phenyl-4,6-di(4-phenyl)phenyl-1,3,5-triazine (CAS No. 204583-39-1). In a further embodiment, the present invention relates to the composition according to the invention, characterised in that the composition substantially consists of polycarbonate and from 0.05 wt. % to 0.5 wt. % of a UV absorber and from 0.0001 wt. % to 0.03 wt. % 2-[2-hydroxy-4-(2-ethylhexyl)oxy]phenyl-4,6-di(4-phenyl)phenyl-1,3,5-triazine (CAS No. 204583-39-1).

The term "substantially consists of polycarbonate" within the scope of the present invention means that the composition consists mainly, meaning >50%, preferably >70%, 80%, 90% or 95% of polycarbonate.

In preferred embodiments, the composition according to the invention contains from 0.05 wt. % to 0.4 wt. %, particularly preferably from 0.1 wt. % to 0.35 wt. %, UV absorber and from 0.0001 wt. % to 0.01 wt. %, particularly preferably from 0.0001 wt. % to 0.005 wt. %, 2-[2-hydroxy-4-(2-ethylhexyl)oxy]phenyl-4,6-di(4-phenyl)phenyl-1,3,5-triazine (CAS No. 204583-39-1), the wt. % being based in each case on the total composition.

Preparation of the Compositions:

The preparation of a composition containing polycarbonate and from 0.05 wt. % to 0.5 wt. % of a UV absorber and from 0.0001 wt. % to 0.03 wt. % 2-[2-hydroxy-4-(2-ethylhexyl)oxy]phenyl-4,6-di(4-phenyl)phenyl-1,3,5-triazine (CAS No. 204583-39-1) is carried out by means of conventional incorporation processes and can be effected, for example, by mixing solutions of the UV absorbers and of the 2-[2-hydroxy-4-(2-ethylhexyl)oxy]phenyl-4,6-di(4-phenyl)phenyl-1,3,5-triazine with a solution of polycarbonate in suitable solvents such as dichloromethane, haloalkanes, haloaromatic compounds, chlorobenzene and xylenes. The substance mixtures are then preferably homogenised in a known manner by extrusion. The solution mixtures are preferably worked up, for example compounded, in a known manner by evaporating off the solvent and then carrying out extrusion.

In addition, the composition can be mixed in conventional mixing apparatuses such as screw extruders (for example twin-screw extruders, ZSK), kneaders, Brabender or banbury mills, and then extruded. After the extrusion, the extrudate can be cooled and comminuted. It is also possible to mix individual components beforehand and then add the remaining starting materials individually and/or likewise in the form of a mixture.

Production of Polycarbonate Sheets:

Coextruded solid polycarbonate sheets can be produced, for example, by means of the following machines and apparatuses:
- the main extruder with a screw having a length of 33 D and a diameter of 70 mm, with degassing,
- a coextruder for applying the covering layer, with a screw having a length of 25 D and a diameter of 35 mm,
- a special coextrusion sheet die having a width of 450 mm,
- a smoothing calendar,
- a roller conveyor,
- a take-off device,
- a device for cutting to length (saw),
- a delivery table.

Coextruded multi-wall polycarbonate sheets can be produced, for example, by means of the following machines and apparatuses:
- the main extruder with a screw having a length of 33 D and a diameter of 70 mm, with degassing,
- the coex adapter (feedblock system),
- a coextruder for applying the covering layer, with a screw having a length of 25 D and a diameter of 30 mm,
- the special sheet die having a width of 350 mm,
- the calibrator,
- the roller conveyor,
- the take-off device,
- the device for cutting to length (saw),
- the delivery table.

In both sheet types, the polycarbonate granules of the base material are fed to the filling funnel of the main extruder and the material for coextrusion is fed to the filling funnel of the coextruder. Melting and feeding of the material takes place in the respective cylinder/screw plastification system. The two material melts are combined in the coex adapter and, after leaving the die and cooling, form a composite material. The further devices serve to transport the extruded sheets, cut them to length and deposit them.

Sheets without a coextruded layer are produced in a corresponding manner, either by not operating the coextruder or by filling it with the same polymer composition as the main extruder. The present invention therefore relates also to a process for the production of a sheet according to the invention, comprising the steps of extruding and calendering a composition according to the invention.

The present invention relates also to a process for the preparation of a composition according to the invention, characterised in that polycarbonate and from 0.05 wt. % to 0.5 wt. % of a UV absorber and from 0.0001 wt. % to 0.03 wt. % of the compound 2-[2-hydroxy-4-(2-ethylhexyl)oxy]phenyl-4,6-di(4-phenyl)phenyl-1,3,5-triazine (CAS No. 204583-39-1) are combined and mixed, optionally in solvents, wherein optionally homogenisation is carried out and the solvent is removed.

Mechanical Properties:

Tests of the mechanical properties of the compositions can be carried out in accordance with the following standards:

The impact strength can be determined in accordance with DIN EN ISO 180, EN ISO 20180, ASTM D256, DIN EN ISO 179, DIN EN 20179, DIN 53453 or corresponding standards.

The IZOD notched impact strength can be determined, for example, in accordance with ISO 180/1A, ISO 180/1AR or in accordance with ISO 180/1B on specimens having a size of 80*10*4 $mm^3$ or in accordance with ISO 180/4A on specimens having a size of 63.5*12.7*3.2 $mm^3$. A ductile or brittle behavior can be observed (and the respective numbers of samples with such behavior is listed in the tables as "Number ductile" and "Number brittle"), where ductile behavior is preferable.

Measurement of the Charpy notched impact strength is carried out, for example, in accordance with ISO 179/1eA, ISO 179/1eB or ISO 179/1eC or ISO 179/1fA, ISO 179/1fB or ISO 179/1fC on specimens having a size of 80*10*4 $mm^3$ or 63.5*12.7*3.2 $mm^3$.

The tensile-impact strength of notched and unnotched specimens can be determined in accordance with DIN EN ISO 8256, DIN EN 28256, DIN 53448 or corresponding standards.

Further mechanical characteristic values, such as tensile modulus, tensile stress at yield, elongation at yield, breaking stress, breaking elongation or nominal breaking elongation, can be obtained from a tensile test in accordance with DIN EN ISO 527, DIN EN 20527, DIN 53455/53457, DIN EN 61, ASTM D638 or corresponding standards.

A bending test in accordance with DIN EN ISO 178, DIN EN 20178, DIN 53452/53457, DIN EN 63, ASTM D790 or corresponding standards provides characteristic stress and elongation values such as, for example, bending modulus of elasticity, bending stress in the case of conventional deflection (3.5% bending stress), flexural strength, bending elongation at flexural strength, bending stress at fracture or bending elongation at fracture.

The Vicat softening temperature (VST) can be determined in accordance with DIN ISO 306, ASTM D1525 or corresponding standards.

Characteristic force and deflection values are obtained from an impact penetration test in accordance with DIN EN ISO 6603-2 or corresponding standards.

Weathering:

The weathering of samples can be effected by various methods. These include, inter alia, the Xenon-WOM method according to ASTM G6, ASTM G151, ASTM G155, DIN EN ISO 4892-2, SAE J 1885 or VDA 75202, the LSL-WOM method according to DIN EN ISO 4892-3, the Xenotest® High Energy according to DIN EN ISO 4892-2 or DIN EN 50014, the fog test according to ASTM B117, DIN 50021, DIN EN ISO 7253, DIN EN 9227 or ISO 11503, and the QUV test according to ISO 4892-3 or ASTM G154 and ASTM G53.

Rheological Properties:

The melt index (MFR, MVR) is determined in accordance with ISO 1133 or in accordance with ASTM D1238 MVR.

The melt viscosity is measured in accordance with ISO 11443 or DIN 548111.

Solution viscosities can be determined, for example, in accordance with standards ISO 1628-1/-4 or DIN 51562-3.

Optical Measurements:

The degree of gloss can be determined using a reflectometer on sheets having a size of 60*40*2 mm$^3$, thicknesses of not only 2 mm but also of 3 mm, 3.2 mm and 4 mm being considered. DIN 67530, ISO 2813, ASTM D523 or corresponding standards are used for this measurement.

Haze and transmittance determinations are carried out in accordance with DIN 5036, ASTM D1003, ASTM E179 or ISO 13468.

The yellowness index YI is calculated in accordance with ASTM E313.

Reflection measurements can be carried out in accordance with DIN 5036 or ASTM E179.

ISO 105-A02 can be used to determine the grey scale.

Preparation of the Examples:

The device for compounding consists of:
metering device for the components
  a co-rotating twin-shaft kneader (ZSK 53 from Werner & Pfleiderer) having a screw diameter of 53 mm
  a perforated die for forming molten extrudates
  a water bath for cooling and solidifying the extrudates
  a granulator.

The following compositions of Examples 1 to 33 are prepared by means of the above-described compounding device.

Makrolon® 3108 550115 is obtainable commercially from Bayer MaterialScience AG.

Makrolon® 3108 550115 has EU/FDA quality and does not contain UV absorber. The melt volume rate (MVR) according to ISO 1133 is 6.0 cm$^3$/(10 min) at 300° C. and 1.2 kg load.

When preparing the compounds, the procedure is as follows: 5 wt. % of a powder mixture of Makrolon® 3108 550115 powder containing the substances mentioned in the Examples are added to 95 wt. % Makrolon® 3108 550115 granules, so that the mixtures (compounds) mentioned in the Examples are obtained.

EXAMPLES

Example 1

99.798 wt. % Makrolon® 3108 550115
0.200 wt. % Tinuvin 350® from Ciba
0.002 wt. % 2-[2-hydroxy-4-(2-ethylhexyl)oxy]phenyl-4,6-di(4-phenyl)-phenyl-1,3,5-triazine Example 2

99.798 wt. % Makrolon® 3108 550115
0.202 wt. % Tinuvin 350® from Ciba

Example 3

99.800 wt. % Makrolon® 3108 550115
0.200 wt. % Tinuvin 350® from Ciba

Example 4

99.798 wt. % Makrolon® 3108 550115
0.200 wt. % Tinuvin 329® from Ciba
0.002 wt. % 2-[2-hydroxy-4-(2-ethylhexyl)oxy]phenyl-4,6-di(4-phenyl)-phenyl-1,3,5-triazine Example 5

99.798 wt. % Makrolon® 3108 550115
0.202 wt. % Tinuvin 329® from Ciba

Example 6

99.800 wt. % Makrolon® 3108 550115
0.200 wt. % Tinuvin 329® from Ciba

Example 7

99.798 wt. % Makrolon® 3108 550115
0.200 wt. % Tinuvin 234® from Ciba
0.002 wt. % 2-[2-hydroxy-4-(2-ethylhexyl)oxy]phenyl-4,6-di(4-phenyl)-phenyl-1,3,5-triazine Example 8

99.798 wt. % Makrolon® 3108 550115
0.202 wt. % Tinuvin 234® from Ciba

Example 9

99.800 wt. % Makrolon® 3108 550115
0.200 wt. % Tinuvin 234® from Ciba

Example 10

99.798 wt. % Makrolon® 3108 550115
0.200 wt. % Tinuvin 326® from Ciba
0.002 wt. % 2-[2-hydroxy-4-(2-ethylhexyl)oxy]phenyl-4,6-di(4-phenyl)-phenyl-1,3,5-triazine Example 11

99.798 wt. % Makrolon® 3108 550115
0.202 wt. % Tinuvin 326® from Ciba

Example 12

99.800 wt. % Makrolon® 3108 550115
0.200 wt. % Tinuvin 326® from Ciba

Example 13

99.798 wt. % Makrolon® 3108 550115
0.200 wt. % Tinuvin 360® from Ciba
0.002 wt. % 2-[2-hydroxy-4-(2-ethylhexyl)oxy]phenyl-4,
  6-di(4-phenyl)-phenyl-1,3,5-triazine

Example 14

99.798 wt. % Makrolon®3108 550115
0.202 wt. % Tinuvin 360® from Ciba

Example 15

99.800 wt. % Makrolon® 3108 550115
0.200 wt. % Tinuvin 360® from Ciba

Example 16

99.798 wt. % Makrolon® 3108 550115
0.200 wt. % Tinuvin 1577® from Ciba
0.002 wt. % 2-[2-hydroxy-4-(2-ethylhexyl)oxy]phenyl-4,
  6-di(4-phenyl)-phenyl-1,3,5-triazine

Example 17

99.798 wt. % Makrolon® 3108 550115
0.202 wt. % Tinuvin 1577® from Ciba

Example 18

99.800 wt. % Makrolon® 3108 550115
0.200 wt. % Tinuvin 1577® from Ciba

Example 19

99.798 wt. % Makrolon® 3108 550115
0.200 wt. % Cyasorb® UV-1164 from Cytec Industries Inc.
0.002 wt. % 2-[2-hydroxy-4-(2-ethylhexyl)oxy]phenyl-4,
  6-di(4-phenyl)-phenyl-1,3,5-triazine

Example 20

99.798 wt. % Makrolon® 3108 550115
0.202 wt. % Cyasorb® UV-1164 from Cytec Industries Inc.

Example 21

99.800 wt. % Makrolon® 3108 550115
0.200 wt. % Cyasorb® UV-1164 from Cytec Industries Inc.

Example 22

99.798 wt. % Makrolon® 3108 550115
0.200 wt. % Uvinul® 3035 from BASF AG
0.002 wt. % 2-[2-hydroxy-4-(2-ethylhexyl)oxy]phenyl-4,
  6-di(4-phenyl)-phenyl-1,3,5-triazine

Example 23

99.798 wt. % Makrolon® 3108 550115
0.202 wt. % Uvinul® 3035 from BASF AG

Example 24

99.800 wt. % Makrolon® 3108 550115
0.200 wt. % Uvinul® 3035 from BASF AG

Example 25

99.798 wt. % Makrolon® 3108 550115
0.200 wt. % Uvinul® 3039 from BASF AG
0.002 wt. % 2-[2-hydroxy-4-(2-ethylhexyl)oxy]phenyl-4,
  6-di(4-phenyl)-phenyl-1,3,5-triazine

Example 26

99.798 wt. % Makrolon® 3108 550115
0.202 wt. % Uvinul® 3039 from BASF AG

Example 27

99.800 wt. % Makrolon® 3108 550115
0.200 wt. % Uvinul® 3039 from BASF AG

Example 28

99.798 wt. % Makrolon® 3108 550115
0.200 wt. % Uvinul® 3030 from BASF AG
0.002 wt. % 2-[2-hydroxy-4-(2-ethylhexyl)oxy]phenyl-4,
  6-di(4-phenyl)-phenyl-1,3,5-triazine

Example 29

99.798 wt. % Makrolon® 3108 550115
0.202 wt. % Uvinul® 3030 from BASF AG

Example 30

99.800 wt. % Makrolon® 3108 550115
0.200 wt. % Uvinul® 3030 from BASF AG

Example 31

99.798 wt. % Makrolon® 3108 550115
0.200 wt. % Hostavin® B-CAP from Clariant GmbH
0.002 wt. % 2-[2-hydroxy-4-(2-ethylhexyl)oxy]phenyl-4,
  6-di(4-phenyl)-phenyl-1,3,5-triazine

Example 32

99.798 wt. % Makrolon® 3108 550115
0.202 wt. % Hostavin® B-CAP from Clariant GmbH

Example 33

99.800 wt. % Makrolon®3108 550115
0.200 wt. % Hostavin® B-CAP from Clariant GmbH The compounds of Examples 1 to 33 are subsequently processed to form specimens having a size of 63.5*12.7*3.2 mm$^3$. This is carried out by means of an Arburg Allrounder 270S-500-60 having a screw diameter of 18 mm.

| Process parameter | Compounds from Examples 1 to 33 |
|---|---|
| Extruder heating zones | |
| Extruder Z1 | 290° C. |
| Extruder Z2 | 295° C. |
| Extruder Z3 | 300° C. |
| Extruder Z4 | 300° C. |
| Tool temperature | 95° C. |
| Injection pressure (max.) | 1600 bar |
| Dwell pressure (support point 1) | 1200 bar |
| Dwell pressure (support point 2) | 1000 bar |
| Dwell pressure (support point 3) | 800 bar |
| Back pressure | 100 bar |

The light transmission determinations in accordance with ASTM D1003 are then determined on the specimens of Examples 1 to 33, and the yellowness index YI is calculated in accordance with ASTM E313.

The change in the optical properties of the specimens before and after irradiation is calculated. The IZOD notched impact strength of the irradiated and (irradiated specimens is determined in accordance with ISO 180/4A at −20° C. (irradiated) and 23° C. respectively (unirradiated).

Table 1 lists IZOD notched impact strength of Examples 1 to 33 determined in accordance with ISO 180/4A at 23° C.

TABLE 1

| Ex. | wt-% | UV-Absorber | wt-% CGX UVA 006 | mean [kJ/m2] | Number ductile | Number brittle |
|---|---|---|---|---|---|---|
| 1 | 0.200% | Tinuvin 350 | 0.002% | 89.31 | 10 | 0 |
| 2 | 0.202% | Tinuvin 350 | — | 87.43 | 9 | 1 |
| 3 | 0.200% | Tinuvin 350 | — | 86.79 | 10 | 0 |
| 4 | 0.200% | Tinuvin 329 | 0.002% | 89.78 | 10 | 0 |
| 5 | 0.202% | Tinuvin 329 | — | 88.83 | 10 | 0 |
| 6 | 0.200% | Tinuvin 329 | — | 87.54 | 10 | 0 |
| 7 | 0.200% | Tinuvin 234 | 0.002% | 88.35 | 10 | 0 |
| 8 | 0.202% | Tinuvin 234 | — | 84.86 | 6 | 4 |
| 9 | 0.200% | Tinuvin 234 | — | 87.81 | 10 | 0 |
| 10 | 0.200% | Tinuvin 326 | 0.002% | 89.65 | 10 | 0 |
| 11 | 0.202% | Tinuvin 326 | — | 88.63 | 10 | 0 |
| 12 | 0.200% | Tinuvin 326 | — | 86.45 | 10 | 0 |
| 13 | 0.200% | Tinuvin 360 | 0.002% | 87.88 | 10 | 0 |
| 14 | 0.202% | Tinuvin 360 | — | 86.04 | 10 | 0 |
| 15 | 0.200% | Tinuvin 360 | — | 86.72 | 10 | 0 |
| 16 | 0.200% | Tinuvin 1577 | 0.002% | 88.97 | 10 | 0 |
| 17 | 0.202% | Tinuvin 1577 | — | 86.11 | 5 | 5 |
| 18 | 0.200% | Tinuvin 1577 | — | 86.92 | 10 | 0 |
| 19 | 0.200% | Cyasorb UV-1164 | 0.002% | 90.67 | 10 | 0 |
| 20 | 0.202% | Cyasorb UV-1164 | — | 88.01 | 10 | 0 |
| 21 | 0.200% | Cyasorb UV-1164 | — | 88.63 | 10 | 0 |
| 22 | 0.200% | Uvinul 3035 | 0.200% | 91.14 | 10 | 0 |
| 23 | 0.202% | Uvinul 3035 | — | 89.17 | 10 | 0 |
| 24 | 0.200% | Uvinul 3035 | — | 87.54 | 10 | 0 |
| 25 | 0.200% | Uvinul 3039 | 0.002% | 87.4 | 10 | 0 |
| 26 | 0.202% | Uvinul 3039 | — | 85.9 | 10 | 0 |
| 27 | 0.200% | Uvinul 3039 | — | 85.84 | 10 | 0 |
| 28 | 0.200% | Uvinul 3030 | 0.002% | 87.13 | 10 | 0 |
| 29 | 0.202% | Uvinul 3030 | — | 86.62 | 10 | 0 |
| 30 | 0.200% | Uvinul 3030 | — | 87.06 | 10 | 0 |
| 31 | 0.200% | Hostavin B-CAP | 0.002% | 89.03 | 10 | 0 |
| 32 | 0.202% | Hostavin B-CAP | — | 85.97 | 10 | 0 |
| 33 | 0.200% | Hostavin B-CAP | — | 86.18 | 10 | 0 |

The values of IZOD notched impact strength of the present composition are good and show the beneficial effect of the present invention.

The specimens are then continuously irradiated in a QUV 1800W from Q-Panel in accordance with ISO 4892-3 analogously to Method 1 at a black panel temperature of 60° C., with 313 nm for a period of 100 hours.

The light transmission determinations in accordance with ASTM D1003 are then conducted on the irradiated specimens, and the yellowness index YI is calculated in accordance with ASTM E313 and change in optical properties is calculated (Table 2).

TABLE 2

| | Ex. | weathering time/h | Transmission Ty [%] (D6510°) | Yellowness index YI (D6510°) | Delta Ty | Delta YI |
|---|---|---|---|---|---|---|
| before weathering | 1 | 0 | 86.13 | 2.50 | | |
| | 2 | 0 | 86.88 | 2.12 | | |
| | 3 | 0 | 87.04 | 2.12 | | |
| | 4 | 0 | 86.18 | 2.92 | | |
| | 5 | 0 | 85.99 | 3.24 | | |
| | 6 | 0 | 85.71 | 3.19 | | |
| after QUV weathering | 1 | 100 | 83.58 | 15.94 | −2.55 | 13.44 |
| | 2 | 100 | 84.50 | 14.74 | −1.63 | 12.24 |
| | 3 | 100 | 84.49 | 15.36 | −2.39 | 13.24 |
| | 4 | 100 | 83.63 | 16.80 | −3.41 | 14.68 |
| | 5 | 100 | 83.50 | 17.04 | −2.68 | 14.12 |
| | 6 | 100 | 83.45 | 17.06 | −2.54 | 13.82 |

Table 3 lists IZOD notched impact strength of Examples 1 to 33 after 100 h weathering in QUV determined in accordance with ISO 180/4A at −20° C.

TABLE 3

| Ex. | wt-% | UV-Absorber | wt-% CGX UVA 006 | mean [kJ/m2] | Number ductile | Number brittle |
|---|---|---|---|---|---|---|
| 1 | 0.200% | Tinuvin 350 | 0.200% | 14.46 | 0 | 10 |
| 2 | 0.202% | Tinuvin 350 | — | 12.12 | 0 | 10 |

TABLE 3-continued

| Ex. | wt-% | UV-Absorber | wt-% CGX UVA 006 | mean [kJ/m2] | Number ductile | Number brittle |
|---|---|---|---|---|---|---|
| 3 | 0.200% | Tinuvin 350 | — | 12.25 | 0 | 10 |
| 4 | 0.200% | Tinuvin 329 | 0.200% | 14.81 | 0 | 10 |
| 5 | 0.202% | Tinuvin 329 | — | 12.12 | 0 | 10 |
| 6 | 0.200% | Tinuvin 329 | — | 12.08 | 0 | 10 |

The values of IZOD notched impact strength of the present composition are good, in particular after irradiation and at −20° C., and demonstrate the beneficial properties of the composition.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Composition containing polycarbonate and from 0.05 wt. % to 0.5 wt. % of a UV absorber and from 0.0001 wt. % to 0.03 wt. % 2-[2-hydroxy-4-(2-ethylhexyl)oxy]phenyl-4,6-di(4-phenyl)phenyl-1,3,5-triazine, wherein the UV absorber has the formula (4):

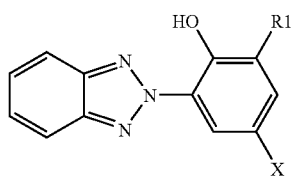

Formula (4)

wherein R1 and X are the same or different and can be H or alkyl or alkylaryl or
the formula (6):

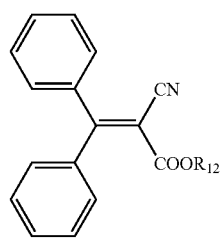

Formula (6)

wherein $R_{12}$ represents aryl or alkyl.

2. Composition according to claim 1, wherein R1 represents 1-methylpropyl and X represents tert.-butyl.

3. Composition according to claim 1, wherein R1 represents H and X represents octyl.

4. Composition according to claim 1, wherein R1 and X represent 1-methyl-1-phenyl-ethyl.

5. Composition according to claim 1, wherein the UV absorber is 2-(5 chloro-2H-benzotriazol-2-yl)-6-((1,1-dimethylethyl)-4-methyl)-phenol.

6. Composition according to claim 1, wherein the UV absorber is 2,2'-methylenebis[6-(2H-benzotriazol-2-yl)-4-(1,1,3,3-tetramethylbutyl)-phenol] (CAS No. 103597-45-1).

7. Composition according to claim 1, wherein $R_{12}$ represents ethyl.

8. Composition according to claim 1, wherein $R_{12}$ represents 2-ethylhexyl.

9. Composition according to claim 1, wherein the UV absorber is 1,3-bis-[(2'-cyano-3',3'-diphenylacryloyl)oxy]-2,2-bis-{[(2'-cyano-3',3'-diphenylacryloyl)oxy]methyl}-propane (CAS No. 178671-58-4).

10. Composition according to claim 1, containing from 0.05 wt. % to 0.4 wt. % UV absorber.

11. Composition according to claim 1, containing from 0.0001 wt. % to 0.01 wt. % 2-[2-hydroxy-4-(2-ethylhexyl)oxy]phenyl-4,6-di(4-phenyl)phenyl-1,3,5-triazine (CAS No. 204583-39-1).

12. Process for the preparation of a composition according to claim 1, wherein polycarbonate and from 0.05 wt. % to 0.5 wt. % of a UV absorber and from 0.0001 wt. % to 0.03 wt. % of the compound 2-[2-hydroxy-4-(2-ethylhexyl)oxy]phenyl-4,6-di(4-phenyl)phenyl-1,3,5-triazine (CAS No. 204583-39-1) are combined and mixed.

13. Sheet containing the composition according to claim 1.

14. Sheet according to claim 13, wherein the sheet is a solid or multi-wall sheet.

15. Sheet according to claim 13, wherein the sheet is a multi-layer sheet which has a base layer, the base layer containing the composition.

16. Process for the production of a sheet according to claim 13, comprising the steps of extruding or coextruding said composition.

17. Composition according to claim 1, characterised in that the UV absorber and 2-[2-hydroxy-4-(2-ethylhexyl)oxy]phenyl-4,6-di(4-phenyl)phenyl-1,3,5-triazine (CAS No. 204583-39-1) are present in a weight ratio of from 5000:1 to 30:1.

18. Composition according to claim 1, wherein the UV absorber has the formula (4):

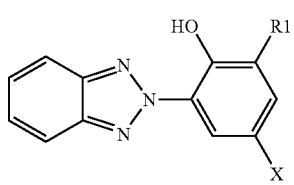

Formula (4)

wherein R1 and X are the same or different and can be H or alkyl or alkylaryl.

* * * * *